Patented June 2, 1953

2,640,826

UNITED STATES PATENT OFFICE 2,640,826

PRODUCTION OF HEXAMINE

Alexander F. MacLean, Robstown, and Adin Lee Stautzenberger, Corpus Christi, Tex., assignors to Celanese Corporation of America, New York, N. Y., a corporation of Delaware No Drawing. Application November 8, 1949, Serial No. 126,244

3 Claims. (Cl. 260—248.6)

The present invention relates to the production of hexamine by reacting formaldehyde and ammonia.

An object of this invention is the provision of an improved process for the production of hexamine whereby the formaldehyde-ammonia reaction and the concentration and separation of the hexamine formed thereby may be carried out in a continuous manner.

Other objects of this invention will appear hereinafter from the following detailed description.

Hexamine is a reaction product of formaldehyde and ammonia widely employed in the production of thermosetting plastic materials. This product is usually obtained by evaporating a mixture of an aqueous solution of formaldehyde and ammonia by a batch process. Batch processes are quite uneconomical and a suitable continuous process wherein satisfactory yields are obtained has long been sought.

We have found that hexamine may be prepared efficiently and economically in a continuous manner by simultaneously introducing formaldehyde and ammonia into a reaction zone, reacting the mixture in said reaction zone at a temperature of 20 to 70° C. and for 5 to 30 minutes, while maintaining the pH of said reaction mixture at from about 7.0 to 8.0. The aqueous mixture leaving the reaction zone and containing the hexamine formed is then concentrated by evaporation under vacuum, the concentration being advantageously effected under a pressure of about 20 inches of mercury absolute and a temperature of less than 70° C.

By controlling the pH of the mixture undergoing reaction as pointed out above, the reaction proportions employed may be held to substantially stoichiometric quantities. Thus, for every six mols of formaldehyde employed only slightly more than four mols of ammonia are necessary to ensure very high yields, which yields usually approach the theoretical yield based on both reactants.

In order further to illustrate our invention, but without being limited thereto, the following example is given:

Example 3800 parts by weight per hour of 39.9% aqueous formaldehyde are mixed with 580 parts by weight per hour of ammonia, the pH of the mixture obtained being adjusted to 8 by controlling the excess of ammonia present and the mixture formed passed into a reactor maintained at a temperature of 50° C. The reactor is of such dimensions that the reaction mixture is maintained therein for about 30 minutes during its passage therethrough. The aqueous reaction product is then piped into an evaporator or thermosyphon concentrator maintained under a vacuum of 25 inches of mercury where the solution is concentrated at a temperature of about 50° C. Hexamine continuously precipitates from the concentrated solution as the water is vaporized and removed. The hexamine slurry thus produced is continuously withdrawn from the evaporator and fed to a centrifugal filter. The mother liquor discharged from the centrifugal filter is recycled to the concentrator to recover the hexamine remaining in solution. In order to avoid excessive build-up of soluble impurities in the concentrator, a side stream of the mother liquor is taken off and discharged to the sewer. The wet hexamine cake is discharged from the centrifuge and dried. The hexamine formed by our novel process is obtained in a yield of 90% to 95% of theory, and analyzes about 98% hexamine, the remainder being water.

It is to be understood that the foregoing detailed description is given merely by way of illustration and that many variations may be made therein without departing from the spirit of our invention.

Having described our invention, what we desire to secure by Letters Patent is:

1. Process for the production of hexamine, which comprises continuously introducing a mixture of formaldehyde and ammonia into a reaction zone, reacting the mixture formed for 5 to 30 minutes at a temperature of 20 to 70° C. and at a pH of 7 to 8, continuously withdrawing the aqueous solution of hexamine formed from the reaction zone, concentrating the hexamine solution to precipitate hexamine continuously therefrom and separating the precipitated hexamine from the slurry thus formed.

2. Process for the production of hexamine, which comprises continuously introducing a mixture of formaldehyde and ammonia into a reaction zone, reacting the mixture formed for 5 to 30 minutes at a temperature of 20 to 70° C. and at a pH of 7 to 8, continuously withdrawing the aqueous solution of hexamine formed from the reaction zone, concentrating the hexamine solution to precipitate hexamine continuously therefrom, separating the precipitated hexamine from the slurry thus formed and recycling and concentrating at least part of the mother liquor to separate additional hexamine therefrom.

3. Process for the production of hexamine, which comprises continuously introducing a mixture of formaldehyde and ammonia into a reaction zone, reacting the mixture formed for 5 to 30 minutes at a temperature of 20 to 70° C. and at a pH of 7 to 8, continuously withdrawing the aqueous solution of hexamine formed from the reaction zone, concentrating the hexamine solution under vacuum to precipitate hexamine continuously therefrom, separating the precipitated hexamine from the slurry thus formed, and recycling and concentrating at least part of the mother liquor to separate additional hexamine therefrom.

ALEXANDER F. MacLEAN.
ADIN LEE STAUTZENBERGER.

References Cited in the file of this patent

UNITED STATES PATENTS

| Number | Name | Date |
|---|---|---|
| 1,566,820 | Carter | Dec. 22, 1925 |
| 1,774,929 | Landt et al. | Sept. 2, 1930 |
| 2,449,040 | Schideler et al. | Sept. 7, 1948 |

OTHER REFERENCES

Latapie: Chem. Abstracts, vol. 38 (1944), p. 1209.